Dec. 2, 1941.  O. M. CRUMLY  2,265,063
MEANS FOR HOLDING AND CONTROLLING A HOSE AND NOZZLE
Filed May 29, 1939   6 Sheets-Sheet 1

Dec. 2, 1941.   O. M. CRUMLY   2,265,063
MEANS FOR HOLDING AND CONTROLLING A HOSE AND NOZZLE
Filed May 29, 1939   6 Sheets-Sheet 2
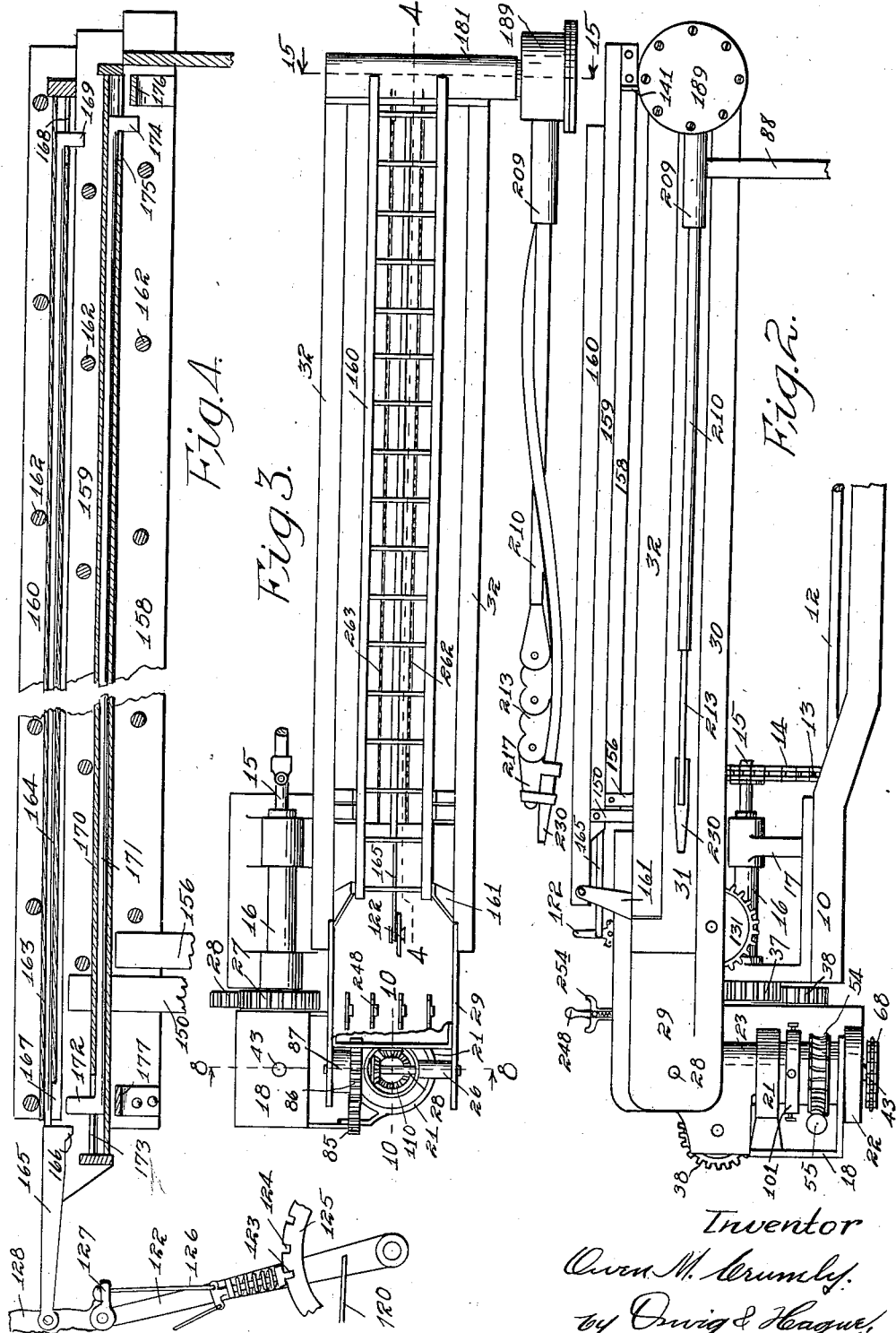
Inventor
Owen M. Crumly
by Orwig & Hague
Attys

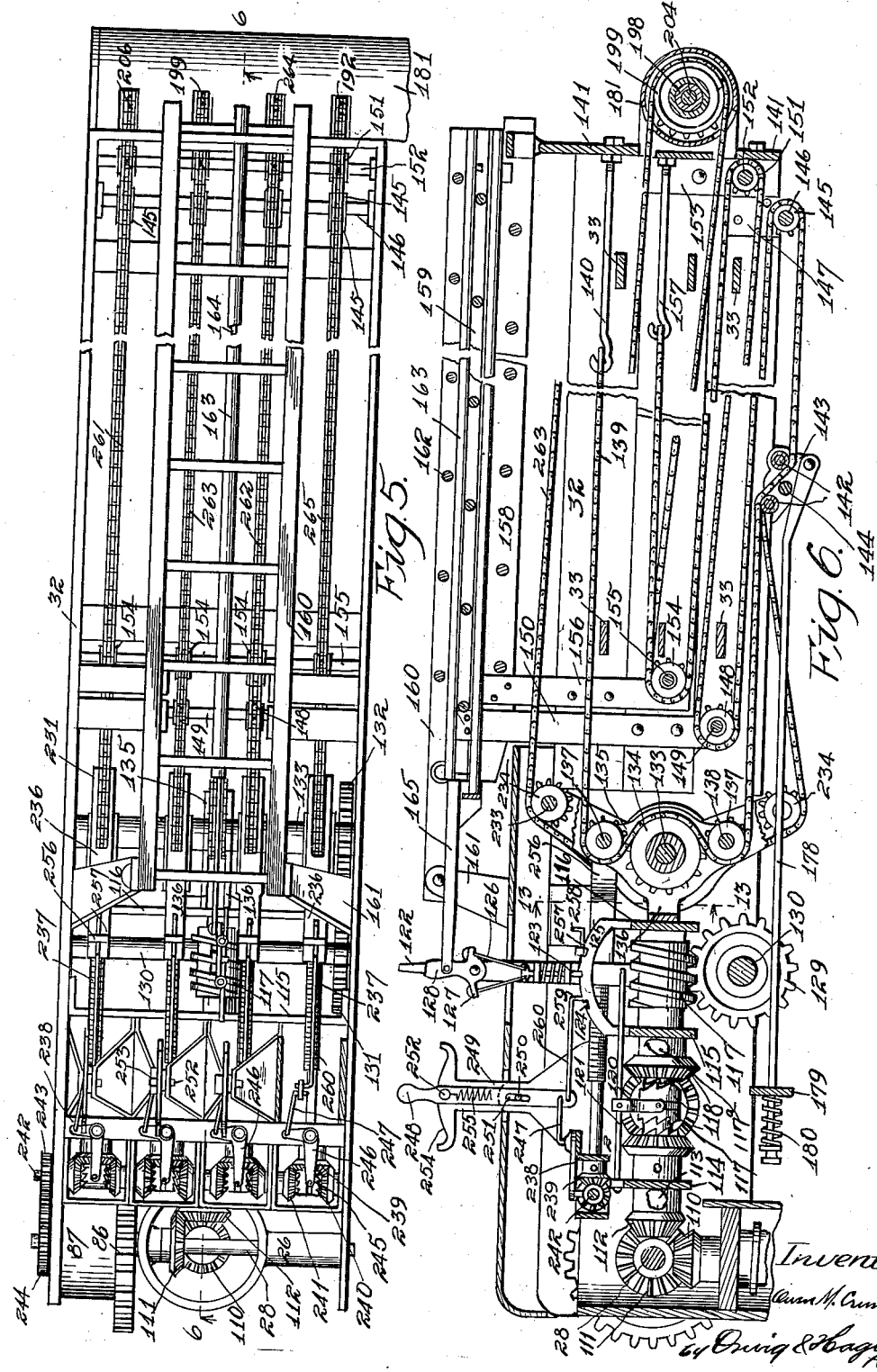

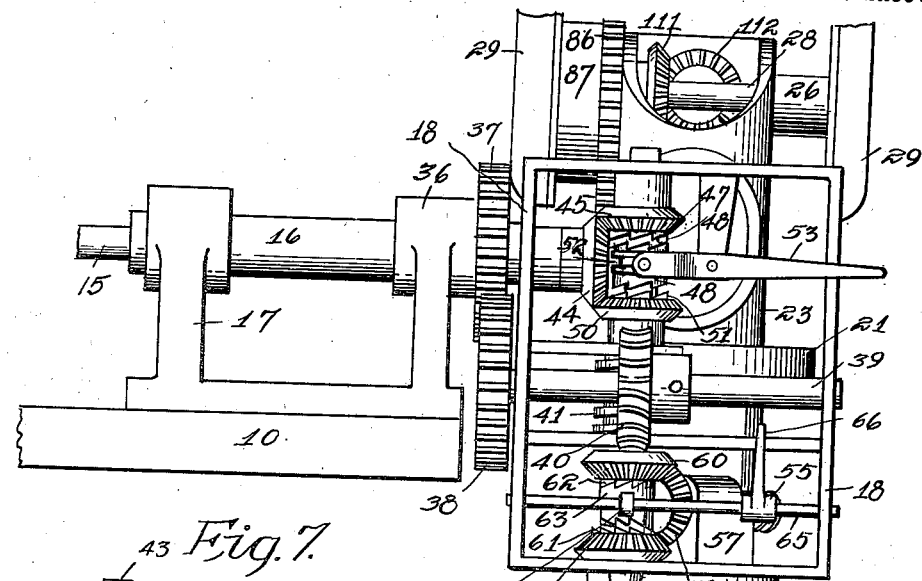

Dec. 2, 1941. O. M. CRUMLY 2,265,063
MEANS FOR HOLDING AND CONTROLLING A HOSE AND NOZZLE
Filed May 29, 1939 6 Sheets-Sheet 5
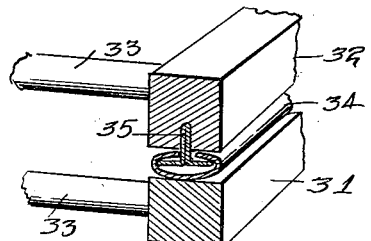
Fig.14.
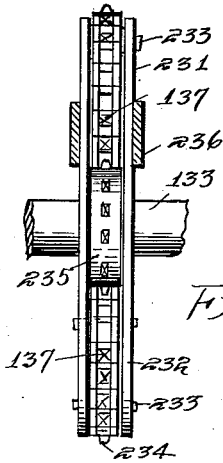
Fig.13.
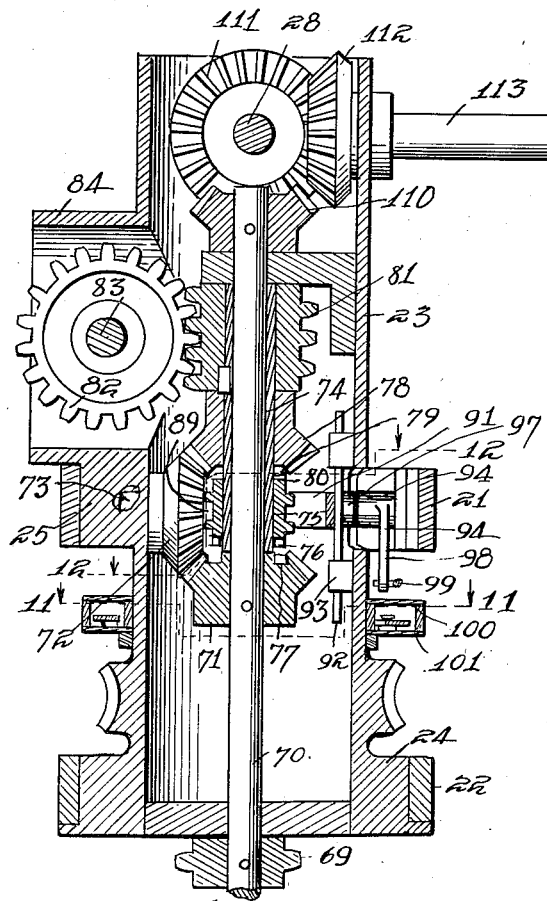
Fig.10.
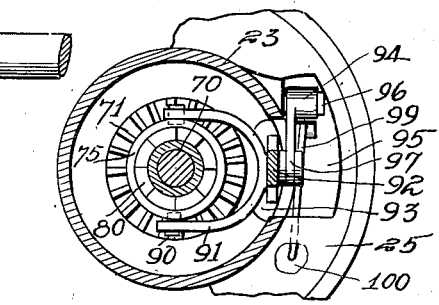
Fig.12.
Fig.11
Inventor
Owen M. Crumly
by Irving E. Hague Attys Dec. 2, 1941.  O. M. CRUMLY  2,265,063
MEANS FOR HOLDING AND CONTROLLING A HOSE AND NOZZLE
Filed May 29, 1939  6 Sheets-Sheet 6
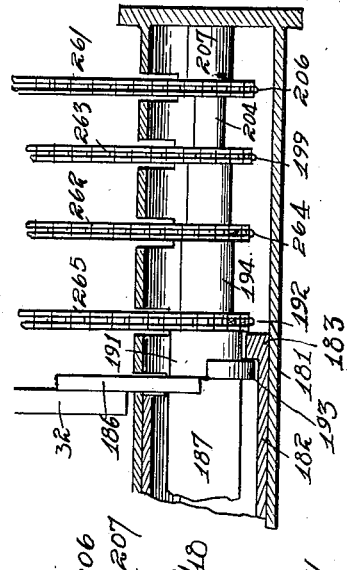
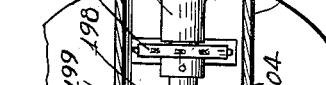
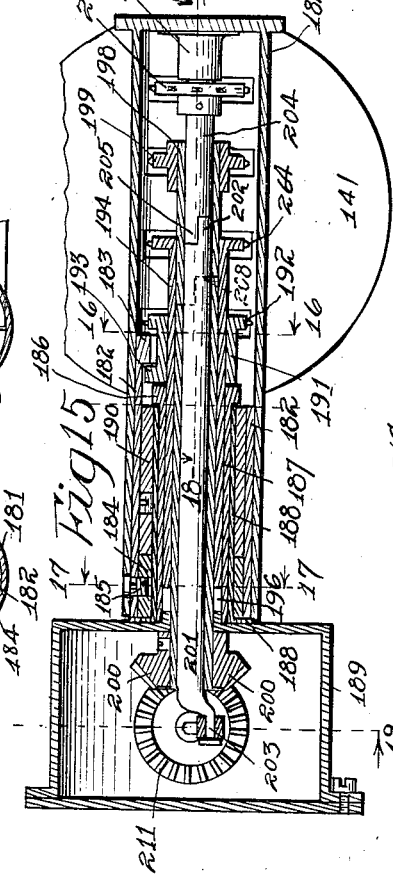
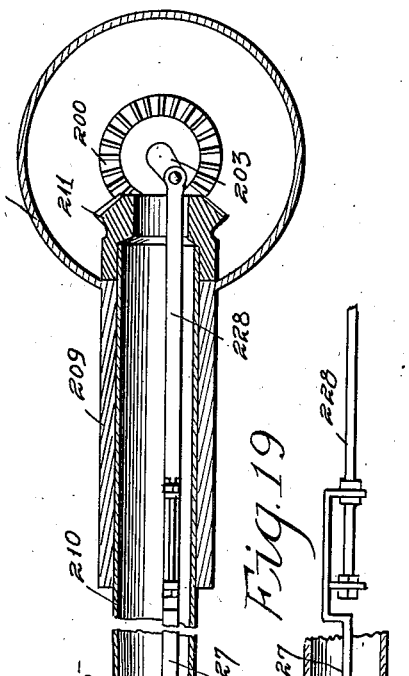
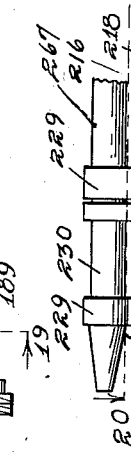
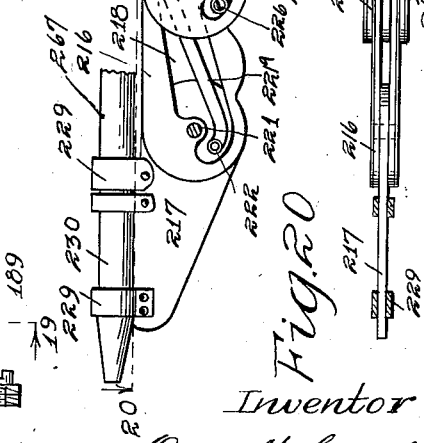
Inventor
Owen M. Crumly
by Owing & Hague, Attys Patented Dec. 2, 1941

2,265,063

UNITED STATES PATENT OFFICE 2,265,063

MEANS FOR HOLDING AND CONTROLLING A HOSE AND NOZZLE

Owen M. Crumly, Carlisle, Iowa

Application May 29, 1939, Serial No. 276,260

17 Claims. (Cl. 169—25)

This invention relates to improvements in fire fighting apparatus and more particularly to means for mechanically supporting and operating the discharge nozzle of the fire hose.

The object of my invention is to provide an improved mechanism designed to be supported by a portable truck and provided with a telescopic frame having one end pivoted to one end of the truck in such a manner that the telescopic frame may be swung through various angles about a vertical axis and through various angles about a horizontal axis, and also capable of being rotated about an axis extending longitudinally of said frame, and to provide on the free end of said telescopic frame, means for supporting a hose nozzle in such a manner that the hose nozzle may be moved at various angles relative to the frame, and in connection therewith means controlled from a point near the pivotal end of said telescopic frame for controlling and moving the nozzle to various positions relative to its supporting frame whereby an operator may control the nozzle, to which a suitable hose has been connected, for directing a stream of water at any desired angle and with the nozzle supported within a burning building or in any other desired position close to the fire, and under conditions that would not be possible to be encountered by a fireman.

A further object of my invention is to provide in connection with a pivotally mounted and telescopic frame of the type above described, improved means for manually controlling and mechanically operating the frame to adjust it to its various positions of movement, wherein the free end of the frame may be directed upwardly at various angular positions about a vertical axis or may be moved to a horizontal folded position adjacent to the supporting truck, or wherein the frame may be rotated about its longitudinal axis or wherein the free end of the frame may be directed downwardly at various angular positions about a vertical axis.

A further object of my invention is to provide in a device of the type above described, and employing a telescopic frame, improved manually controlled means for mechanically lengthening or shortening the frame, and further in connection therewith improved manually controlled and mechanically operated means for controlling the position of the nozzle relative to its supporting frame when the frame is at any of its positions of movement to lengthen or shorten the same.

A further object of my invention is to provide on the outer end of a supporting frame or mast a rotatably mounted nozzle-supporting arm adapted to swing about an axis at right angles to the longitudinal axis of the frame, and to provide on the outer end of said arm a nozzle-supporting clamp for supporting a hose nozzle to which a suitable hose may be connected, and in connection therewith improved means for supporting the hose clamp whereby the position of the nozzle may be varied and adjusted relative to the arm by being rotated about an axis extending longitudinally of the arm, and by being adjusted to various angular positions about an axis at right angles to the longitudinal axis of said arm.

A further object is to provide in connection therewith an improved nozzle clamp for flexibly supporting the nozzle to said frame, and means for actuating the nozzle when in its various adjusted positions.

A further object is to provide in connection with a telescopic frame, means for supporting a ladder wherein the nozzle-controlling mechanism at the upper end of the frame may be easily reached by the fireman operating the mechanism.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved fire fighting apparatus showing in solid lines the manner in which the discharge nozzle may be placed in through a window of a building and in which a stream of water may be directed in an outward direction against the inner face of the outer wall, and showing the supporting frame in another position in dotted lines and also the nozzle-supporting arm in dotted lines in another position;

Figure 2 is a side elevation of my improved mechanism when folded and not in use, with a portion of the supporting frame broken away;

Figure 3 is a plan view of the same;

Figure 4 is an enlarged detail segmental sectional view of the ladders taken on the line 4—4 of Fig. 3;

Figure 5 is an enlarged detail segmental plan view of my improved mechanism;

Figure 6 is a detail sectional view of the same taken on the line 6—6 of Figure 5.

Figure 7 is an enlarged detail end elevation of a portion of the supporting frame and the pivoted end of the telescopic frame with the last frame at right angles to its normal position, as shown in Figure 2;

Figure 8 is a sectional end elevation of the device when in its folded position, taken on the line 8—8 of Figure 3;

Figure 9 is an enlarged detail sectional view taken on the line 9—9 of Figure 8;

Figure 10 is an enlarged detail sectional view taken on the line 10—10 of Figure 3;

Figure 11 is an enlarged detail sectional view taken on the line 11—11 of Figure 10;

Figure 12 is an enlarged detail sectional view taken on the line 12—12 of Figure 10;

Figure 13 is an enlarged detail sectional view taken on the line 13—13 of Figure 6 illustrating one of the devices for controlling the action of the nozzle clamp;

Figure 14 is an enlarged sectional perspective view showing the manner in which the telescopic sections of the frame are slidably supported together;

Figure 15 is an enlarged detail sectional view taken on the line 15—15 of Figure 3;

Figure 16 is an enlarged detail sectional view taken on the line 16—16 of Figure 15;

Figure 17 is an enlarged detail sectional view taken on the line 17—17 of Figure 15;

Figure 18 is a sectional view taken on the line 18—18 of Figure 15;

Figure 19 is a longitudinal sectional view of the hose-supporting arm and the flexible element for operating the nozzle clamp, taken substantially on the line 19—19 of Figure 15, with the hose-supporting clamp rotated through an angle of 90°.

Figure 20 is a detail sectional view taken on the line 20—20 of Figure 19.

Figure 1:
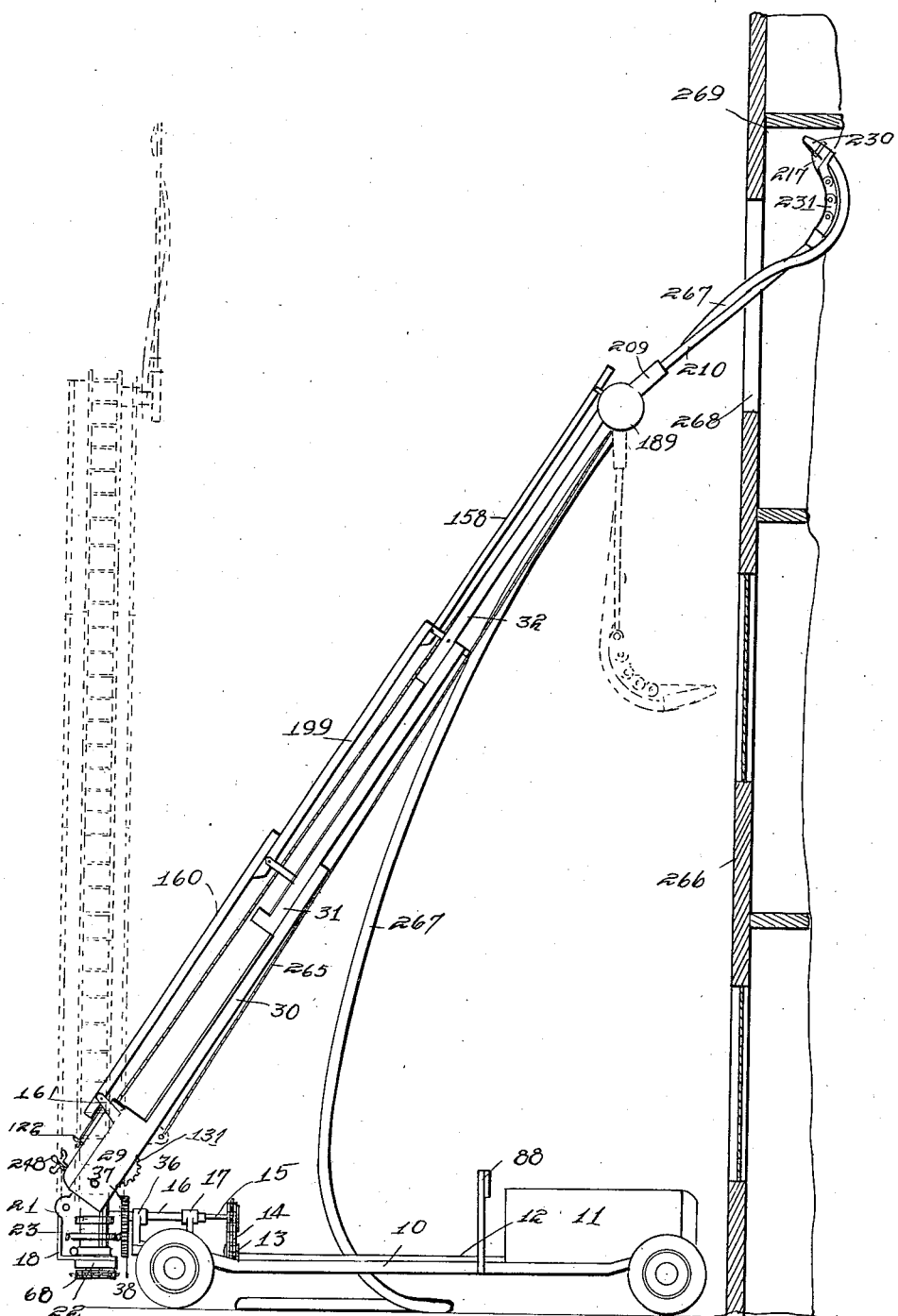

Referring to Figure 1 of the drawings, I have used the reference numeral 10 to indicate the frame of a truck for supporting my improved device, said frame having at its forward end a housing 11 in which is included a power unit such as is ordinarily used on trucks and from which is extended a drive shaft 12. The rear end of the said shaft 12 has a sprocket wheel 13 carrying a chain 14 for imparting motion to the shaft 15 which constitutes the main drive shaft of my improved device. The shaft 15 is rotatably mounted in a sleeve 16, said sleeve being carried by a suitable bracket 17 supported on the rear end of the truck 10. One end of the sleeve 16 is fixed to a gear casing 18 (see Figs. 7, 8 and 10) wherein said gear casing 18 may be rotated about the shaft 15 as an axis. One edge of the gear casing 18 is provided with laterally extending portions 19 and 20 (Fig. 8), the member 19 terminating in an annular frame portion 21 and the member 20 having fixed thereto an annular frame member 22.

Rotatably mounted in the members 21 and 22 is a second gear casing 23 having an annular portion 24 at its lower end rotatably mounted in the member 22, and an annular portion 25 rotatably mounted in the member 21. The upper end of the gear casing 23 is provided with laterally projecting hub portions 26 and 27, said hub portions having rotatably mounted therein a shaft 28, and thereon a pivotally mounted telescopic frame 29, said frame comprising a fixed section 30 (see Figs. 1 and 2), an intermediate section 31 and an end section 32, said sections each comprising parallel side rails and cross members 33. The end section is superimposed on the intermediate section and the intermediate section on the fixed section, the side rails of the sections being slidably connected by means of a channel member 34 fixed to one of the side rails and a T-bar 35 carried by the adjoining one of said rails, as clearly illustrated in Figure 14, so that the said sections are free to slide one relative to the other for increasing or decreasing the length of the frame, one end of which is pivotally connected to the truck 10 by the gear casings 18 and 23, and the hubs 26 and 27 and the sleeve 16, these connections providing means whereby the free end of the frame may be swung through various angles relative to the truck body with the free end extending upwardly or even downwardly if so desired. This pivotal arrangement also permits the frame to be rotated about its longitudinal axis for the purposes hereinafter more clearly set forth.

For controlling the movement of the said frame 29 about its pivotal end I have provided the following mechanism: Fixed to the bearing member 36 of the bracket 17 is a gear 37 in mesh with a gear 38 carried by a shaft 39 rotatably mounted in the gear casing 18. Fixed to the shaft 39 is a worm gear 40, which is in mesh with a worm 41 carried by a sleeve 42. (See Fig. 9.) The sleeve 42 is rotatably supported on a vertically arranged shaft 43 supported in the gear casing 18 and in alignment with the shaft 15. Fixed to the inner end of the shaft 15 is a bevel-gear 44 in mesh with a bevel-gear 45 carried by the upper end of the shaft 43 and fixed thereto by means of a pin 46. The inner face of the gear 45 is provided with a clutch element 47 adapted to co-act with the upper end of a clutch element 48 carried by a shift collar 48a on the upper end of the sleeve 42 and splined thereto by means of a key 49. The gear 44 is also in mesh with a bevel-gear 50 rotatably mounted on the said sleeve 42. The gear 50 has a clutch element 51 adapted to co-act with a clutch element 48b on the lower end of the shift collar 48a, said shift collar 48a having a groove 52 for receiving a shift lever 53 by means of which the said element 48 may be elevated or lowered and operatively connected with either of the gears 45 or 50, thus providing means whereby rotation may be imparted to the worm 41 by means of the sleeve 42, which in turn is driven from the bevel-gear 44 by either of the gears 45 or 50, the shaft 15 being driven from the power shaft, all as in the manner heretofore described. A lever 53 provides means whereby the worm 41 may be rotated in either direction or whereby said worm may be stopped by moving the shift collar 48a to a neutral position. It will be seen that if the worm 41 is rotated, then the gear 40 will be rotated and also the gear 38, by means of the shaft 39, which will cause the gear casing 18 to rotate about the gear 37 or about the center of the shaft 15. This in turn will cause the gear casing 23 to be swung from a vertical position, as shown in Figure 8, to a horizontal position, thus providing means for swinging the upper end of the telescopic frame laterally or transversely of the longitudinal axis of the truck, as viewed in Figure 1.

The second frame member 23 may be caused to rotate within the bearing members 21 and 22 by the following mechanism:

Fixed about the member 23 near its lower end is a worm gear 54 adapted to mesh with a worm 55 (see Fig. 8), said worm being secured to a shaft 56 and rotatably mounted in the bearing member 57 carried by the bottom of the gear frame 18. Fixed to the opposite end of the shaft 56 is a bevel-gear 58 adapted to mesh with bevel-gears 59 and 60, the gears 59 and 60 being mounted on the lower end of the vertical shaft 43, said gears having their inner faces provided with clutch elements 61 and 62, respectively, (Fig. 7), said clutch elements being adapted to co-act with the clutch elements formed on the end of a shift collar 63 which is splined to the shaft 43, said shift collar being actuated by a lever 64 carried by a shaft 65 mounted in the gear casing 18, said shaft 65 being actuated by a lever 66. Thus, means is provided whereby the gear 58 may be rotated in either direction by the gears 59 and 60 and wherein the worm 55 may also be rotated in either direction and in turn cause the second gear casing 23 to be rotated about its vertical axis, as viewed in Figure 8. This movement will cause the telescopic frame to rotate about its longitudinal axis when the said frame member is in alignment with the casing 23. The worm gear 54 provides means for locking the casing 23 in any of its adjusted positions when the shift collar 63 is in its neutral or inoperative position. In like manner, the worm 41 provides means for locking the frame 18 against rotation when the member 46a is in its neutral position.

I will now describe the mechanism for swinging the telescopic frame on the hub members 26 and 27: Supported on the lower end of the shaft 43 I have provided a sprocket 67 carrying a chain 68 operating on a sprocket 69 supported on the lower end of a shaft 70 carried by the gear casing 23 (see Fig. 10), said shaft 70 having a bevel-gear 71 in mesh with a bevel-gear 72 carried on a shaft 73 supported in the annular bearing member 25. Rotatably mounted on the shaft 70 above the gear 71 is a sleeve 74 having splined on its lower end a shift collar 75, having its lower end provided with a clutch element 76 adapted to co-act with a clutch element 77 in the gear 71. Rotatably mounted on the sleeve 74 is a bevel-gear 78 in mesh with the bevel gear 72, the inner end of the bevel-gear 78 having a clutch element 79 adapted to co-act with a clutch element 80 on the upper end of the collar 75, thus providing means whereby power may be transmitted from the shaft 70 to the sleeve 74 in either direction by simply shifting the collar 75 longitudinally of the sleeve 74.

Fixed to the upper end of the sleeve 74 is a worm 81 supported to mesh with a worm gear 82 carried by a shaft 83 and in the laterally extending portion 84 on the gear casing 23. Fixed to one end of the shaft 83 is a gear 85 (Fig. 8) in mesh with a gear 86 fixed to a hub 87 rotatably mounted on the hub 27 and secured to the frame member 29, thus providing means whereby, when the member 75 is clutched with one of the bevel-gears 71 or 79, the shaft 83 will be rotated by the worm 81 and the gear 82, and in turn the gear 85, which in turn will cause the gear 86 to rotate and to cause the free end of the frame 29 to be moved about the shaft 28 as an axis and at right angles to the shaft 70, so that the free end of the telescopic frame may be elevated or lowered. The worm gear 82, together with the worm 81, serves to provide means for locking the free end of the frame in any one of its adjusted positions.

By this arrangement it will be seen that the telescopic frame may be adjusted to any angular position about a vertical axis and that the end of the frame may be lowered to position substantially parallel with the frame 18 and resting on a suitable support 88 carried by said truck when in its folded position, as illustrated in Figure 2, or the frame may be moved to an upwardly inclined position, as illustrated in Figure 1, or to a dotted line position, as illustrated in said figure, or to a number of desired positions, and the free end of the frame may also be inclined downwardly in order to extinguish fires in basements, or to any position lower than that occupied by the truck, such as down an embankment.

For shifting the collar 75 I have provided the following mechanism: Said collar 75 is provided with an annular groove 89 for receiving pins 90 carried by a fork 91 (see Fig. 12). The said fork 91 is fixed to a vertical bar 92 slidably mounted in blocks 93 carried by the gear-casing 23. A bell crank lever 94 is supported within an opening 95 formed in the annular member 25 and fixed to the casing 23 by means of a pivot member 96, the said bell crank lever 94 having a horizontally extending arm 97 which has its free end pivotally connected to the bar 92, the said bell crank being provided with a downwardly extending arm 98 provided with a link 99 having one end hooked into an annular plate 100 which is rotatably supported on the casing 23 in such a manner that as the said plate is rotated, the downwardly extending arm 28 will be rocked, causing the free end of the arm 96 to be elevated or lowered, and in turn the bar 92 elevated and lowered and with it the yoke 91 and the member 75.

For locking the plate 100 in either one of two operative or neutral positions I have provided a casing 101 fixed to the under side of the plate 100 and supported therein a slidably mounted lock 102 having its inner end adapted to enter either one of the openings 103 formed in the member 23. Levers 104 are pivotally connected to the under side of the plate 100 by means of pivots 105, said levers having their inner ends operatively connected to the lock 102 and their opposite ends extending outwardly through openings 106 in the casing 101, the outer end of said levers having keys 107 so mounted that as they are pushed inwardly the levers 104 will be rocked and the lock 102 moved outwardly to disengage the opening 103. Pivotally secured to the casing 101 are levers 108, by means of pivots 109, having their inner ends also connected to the lock 102, said lock being provided with a spring 109 for retaining the end of the lock within either one of the openings 103. By this arrangement the shift collar 75 may be actuated by either one of the levers 104 or 108 to release the latch 102, after which the casing 101 and the plate 100 may be rotated in the manner above described, to actuate the said bell crank 94. Thus, means is provided for locking the members 100 and 101 in any of their adjusted positions.

I will now describe the mechanism for increasing or decreasing the length of the telescopic frame which is accomplished by power derived from the shaft 70. Fixed to the upper end of the shaft 70 is a bevel-gear 110 in mesh with a bevel-gear 111 carried by the shaft 28. The bevel-gear 111 is also in mesh with the bevel gear 112 carried by a shaft 113 carried in frame members 114, 115 and 116 (see Figs. 5 and 6), the said shaft being provided with a sleeve 117a having a worm 117 supported between the frame members 115 and 116, said worm being operatively connected to the shaft 113 by a reverse gear device 118 similar to that illustrated in Figure 10 and employing the sleeve 74, and the collar 75 and the gears 72, 71 and 78, the shift collar 119 being similar to the collar 75 and controlled by a yoke 120 supported on a shaft 121 which has one end slidably mounted in the frame member 114 and the other connected to a lever 122, said lever having the usual spring-actuated pawl 123 to operate in notches 124 in the sector 125, the spring-actuated pawl 123 being controlled by rods 126 carried by lugs 127 supported on the pivoted lever 128. The pawl may be released from its notch by swinging the upper end of the lever 128 in either direction, thus providing means whereby the pawl may be automatically released in a manner hereinafter described. By this arrangement it will be seen that the worm 117 may be rotated in either direction by power from the shaft 113, the said worm 117 being in mesh with a worm gear 129 carried on a shaft 130 supported in the fixed section of the telescopic frame, having on its inner end a gear 131 in mesh with a second gear 132 mounted on a shaft 133 (see Fig. 5) also carried by the stationary section of said frame.

Fixed to the central portion of the shaft 133 is a sprocket 134 supported between frame members 135, said frame members having extensions 136 connected to the frame member 116. Supported between the upper ends and also between the lower ends of the members 135 are sprocket pinions 137 mounted on suitable pivots 138. A chain or other flexible device 139 has one end provided wtih a hooked rod 140 mounted in a plate 141 fixed to the outer end of the end section 32 of the frame 29, said plate 141 projecting downwardly across the outer ends of the intermediate section 31 and the fixed section 30. Said chain 139 is passed over the upper pinion 137, around the sprocket 134 in a reverse manner, as illustrated in Figure 6, thence around the lower pinion 137, thence over and between pulleys 142 carried by frame members 143 supported on a rod 144 carried by the frame member 30, thence over a pinion 145 carried by a rod 146 mounted in plates 147 carried by the outer end of the fixed frame member 30. The chain is then passed over a pinion 148 carried by a transversely arranged rod 149 supported in the lower ends of bars 150 attached to the inner end of the intermediate frame 31, thence around a pinion 151 carried by a transversely arranged shaft 152 carried in the lower ends of plates 153 supported on the outer end of the intermediate section 31, thence around a pinion 154 carried by a transversely arranged shaft 155 supported in bars 156 carried by the inner end of the end section 32, thence to a hooked rod 157 carried by the plate 141.

The operation to extend the telescopic frame is as follows: Assuming that the lever 122 has been actuated and the clutch member 119 is operatively connected with one of the gears 118 and that the worm 117 is rotated in such direction as to rotate the sprocket 134 in a counterclockwise direction, then it will be seen that tension will be applied to the lower run of the chain 139, causing said lower run to move towards the left, as viewed in Fig. 6, and then tension to be applied to the upper run of that portion of the chain travelling over the pinion 146, which will tend to move the frame member 30. In like manner, the bar 156 will be moved toward the right, while the upper run of the chain 139 is being extended toward the right, or, in other words, taking up the slack given out by the movements of the members 150 and 156. A reverse movement of the sprocket 134 will tend to draw the frame sections together. Thus, means is provided whereby the frame may be lengthened or shortened by means of power derived from the main drive shaft 15, said power-operated mechanism being manually controlled and set into operation or made to become inoperative by means of the manually operated lever 122. Means is provided whereby the clutch element 119 may be automatically moved to its neutral position at such time that the frame sections have been moved to their maximum extended positions.

The means for automatically moving said clutch element to its neutral position will now be described: It will be seen from Fig. 6 that the members 150 and 156 extend upwardly above the main frame sections, the members 156 having supported thereon one end of a ladder section 158, the other end of said ladder section being carried by the upper edge of the plate 141 in such a manner that said ladder section will be moved in unison with the end section 32 of the telescopic frame. The upper ends of the members 150 support an intermediate ladder section 159 which is slidably mounted on the section 158 by means of guide devices similar to those illustrated in Fig. 14, and slidably mounted on the section 159 is a fixed ladder section 160, the inner or lower end of the section 160 being fixed to uprights 161 carried by the fixed section of said telescopic frame. Each of the said ladder sections is provided with the usual transversely arranged rungs 162. Supported beneath the rungs 162 of the fixed ladder section 160 is a tube 163 (see Fig. 4) in which is slidably mounted a rod 164 having fixed to its inner end a bar 165, the inner end of which is pivotally connected to the member 128 of the lever 122. The outer end of the bar 165 is provided with a downwardly extending portion 166 adapted to travel in a slot 167 in the lower side of the inner end of the tube 163, the outer end of said tube also being provided with a slot 168 for receiving a downwardly extending lug 169 in the outer end of the rod 164.

Supported beneath the rungs 162 of the ladder section 159 is a tube 170 having slidably mounted therein a rod 171, the inner end of which is provided with an upwardly extending lug 172 slidably mounted in the slot 173, the upper end of the member 172 being designed to engage the downwardly extending portion 166 when the ladders are at their inner position of movement. The outer end of the rod 171 is provided with a downwardly extending portion 174 extending through a slot 175 in the tube 170 and adapted to engage a fixed cross bar 176 carried by the ladder section 158.

When it is desired to extend the frame and ladder sections, the lever 122 is moved to the left, also the collar 119, setting in motion the sprocket 134, as illustrated in Figs. 4 and 6, at which time the rod 164 is moved inwardly. The ladder section 159 will then move outwardly or towards the right relative to the ladder section 160, and the section 158 will be moved relative to the section 159, which will cause the lug 172 to engage the lug 169 and the lug 174 to engage a cross bar 177 carried by the section 158 at the time the ladders reach their maximum extended positions, which will cause the rod 171 to be moved outwardly, which in turn will cause the rod 164 to be moved outwardly and the upper end of the member 128 of the lever 122 to be rocked to the right, which will cause the left-hand rod 126 to be elevated, and with it the pawl 123. The lever 122 will then be moved to the right until the pawl 123 enters the middle notch 124, at which time the member 119 will be automatically shifted to its neutral position. If the frame and ladder sections are at their extended position of movement and it is desired to move them to their contracted position, then the lever 122 is shifted to the right and a reverse movement of the rods 164 and 171, and the collar 119 will take place, causing the member 128 to be shifted to the left, together with the lever 122, and the shift collar 119 again returned to its neutral position, thus providing means whereby the frame and ladder sections may be mechanically operated and at the same time provide means whereby any accidental breakage will be prevented in case the operator fails to manually control the lever 122 to throw the shift member 119 to its neutral position. The pulleys 142 and the plates 143 provide means for taking up slack in the chains 139, 261, 262, 263 and 265, each set of plates being pivotally connected to one end of a rod 178, one end of said rod being supported in the frame member 179 and provided with a spring 180 whereby yieldable tension is provided for taking up any slack in the chains 139, 261, 262, 263, and 265.

For supporting and actuating the nozzle supporting arm and the nozzle carried thereby I have provided the following mechanism: Supported adjacent to the outer face of the plate 141 is a housing 181 (see Figs. 6, 15 and 18), one end of the said housing 181 extending laterally beyond one edge of the plate 141 a considerable distance. Rotatably mounted in the outer end of said housing is a sleeve 182 having its inner end provided with a semi-circular flange 183 (see Fig. 16), and its outer end provided with a collar 184, the collar being detachably fixed to the sleeve by means of a screw 185.

Fixed to one of the section members 32 is a bar 186 extending through one side of the casing 181 and supporting a sleeve 187 extending outwardly and terminating at the end of the housing 181. Rotatably mounted on the sleeve 187 is a sleeve 188 having supported on its outer end a gear casing 189 designed to support the nozzle-supporting arm hereinafter described. Fixed on the inner end of the sleeve 188 is a collar 190 adapted to have one end engage the inner end of the collar 184, thus providing means whereby the sleeve 182 will hold the sleeve 188 in position on the sleeve 187. However, the casing 189 may be detached from the housing 181 by simply sliding the sleeve 182 outwardly.

In order to lock the sleeve 182 in position I have provided a rotatably mounted sleeve 191 having a sprocket wheel 192 at one end and a semi-circular lug 193 at its other end (see Fig. 16), this lug 193 being so arranged that one end is against the inner end of the bar 186, as illustrated in Fig. 18, with the lug 193 engaging the lug 183 when the sprocket 192 is in one position of its rotative movement. It will be seen, however, that said sprocket 192 may be rotated to such position that the lug 193 will disengage the lug 183, at which time the sleeve 182 may be withdrawn from the housing 181, thus providing means for detaching the casing 189 from the free end of the telescopic frame.

For rotating the casing 189 about an axis extending longitudinally through the housing 181 I have provided a sleeve 194 rotatably mounted within the sleeve 187, having its outer end terminating near the casing 189 and provided with clutch jaws 195, as illustrated in Fig. 17, the casing 189 also being provided with clutch members 196 to co-act therewith, thus providing means whereby the casing may be detached from the sleeve 194, and at the same time provide means whereby the said casing may be rotated in unison with said sleeve 194. The inner end of the sleeve 194 is provided with a sprocket 264. Rotatably mounted within the sleeve 194 is a sleeve 198 having at its inner end a sprocket 199 with its outer end extending within the casing 189 and provided with a bevel-gear 200, and rotatably mounted within the sleeve 198 is a shaft 201 having a clutch element 202 at its inner end and a crank 203 at its outer end terminating within the casing 189. One end of the sleeve 198 is also provided with a shaft 204 having a clutch element 205 to co-act with the clutch element 202, thus providing means whereby the shaft 201 may be detached from the shaft 204. Rotation is imparted to the said shaft 201 by a sprocket 206 carried on said shaft 204, which in turn is rotatably mounted and supported in a bearing member 207. The inner end of the sleeve 198 is detachably connected with its outer end by means of clutch devices 208, thus providing means whereby the casing 189 and all of the operating shafts and sleeves connected therewith may be detachably connected from their respective driving sprockets. The casing 189 is provided with a laterally extending sleeve 209 (see Fig. 19) in which is rotatably mounted a hollow shaft 210 having at its inner end a bevel-gear 211 supported to mesh with the bevel-gear 200. The outer end of the tubular shaft 210 is somewhat flattened and provided with parallel spaced plates 212 for supporting what I shall term a flexible hose-supporting element 213. This element comprises spaced plates 214 having pivotally supported between them plates 216, and between the outer ends of the plates 216 a nozzle-supporting clamp device 217. Each of the plates 216 and the plates 214 are provided with slots 218 clearly illustrated in Fig. 19, the plates 216 being pivoted to the plates 214 by a pivot 219 and the plates 214 pivotally connected to the members 212 by a pin 220, while the member 217 is pivoted to the members 216 by a pin 221.

Supported within each of the slots 218 of the plates 216 is a link 221a, one end of the links 221a being pivotally connected to the plate 217 by pivots 222, the opposite ends of the links being pivotally connected to the plates 214 by pivots 223. Links 224 are also provided in the plates 214, having their inner ends pivotally connected to the plates 212 by pins 225, and the opposite ends of said links pivotally connected to the plates 216 by pins 226.

Pivotally connected to the inner ends of the plates 214 is a link 227, the inner end of which is swiveled to a link 228, having its inner end pivotally connected to the crank 203.

From this construction it will be seen that if longitudinal movement is imparted to the links 228 and 227, then rotary motion will be imparted to the ends of the plates 214, producing relative movement between the links 224 and said plates 214, which in turn will impart rotary movement to the inner ends of the plates 216 and relative movement between the links 221a and said plates, the inner ends of the links 221a will impart rotary movement to the inner end of the plate 217 causing said plate to assume an angular position relative to the hollow shaft 210. Straps 229 are provided for clamping a nozzle 230 to one edge of the plate 217. By this arrangement it will be seen that the nozzle 230 may be moved at various angular positions relative to a longitudinal axis of the shaft 210 by moving the link 228 longitudinally, or the plane of movement of said nozzle may be swung about the longitudinal axis of the shaft 210 by rotating the gears 200 and 211, and in turn said shaft 210.

The means for imparting rotation to the shaft 210 and longitudinal movement to the link 228, as well as rotation to the casing 189 about the longitudinal axis of the casing 181, and means for imparting rotation to the sprocket 192 or detaching the casing 189 will now be described: The shaft 133 is provided with a series of pivotally mounted frame members 231, each of the said frame members comprising side members 232 spaced apart and connected by means of shafts 233, each of which is provided with a sprocket pinion 234 (see Fig. 13) said frames being pivotally supported on said shaft 133 to oscillate through a limited arc. A sprocket wheel 235 is mounted between the members 232 and fixed to the shaft 133, so that as the shaft 133 is rotated, all of the sprockets 235 will be rotated therewith and in unison with the sprocket 134. Each of the frame members 231 is provided with an operating member 236 pivoted to the frame member 231 at points above the shaft 133, whereby a longitudinal movement of the member 236 will cause the frame 231 to be oscillated. Each of the members 236 is screw-threaded to a shaft 237, one end of which extends through suitable bearings in the frame member 238, and has at its end a bevel-gear 239 which is in mesh with bevel-gears 240 and 241 carried by a shaft 242 extending transversely of the frame member 29. One end of the shaft 242 is provided with a spur-gear 243 in mesh with a second spur-gear 244 mounted on one end of the shaft 28, the gears 240 and 241 being loosely mounted on the shaft 242 and operatively connected therewith by means of shift collars 245, whereby the bevel-gears 239 may be operated in either direction. The shift collars 245 are each operated by means of a bell crank lever 246 pivotally supported on the top edge of the frame member 238. Each of the bell crank levers 246 has a link 247 connected to the lower end of a lever 248 pivotally supported to a standard 249, by means of a pivot 250, and supported by the frame members 238 and 115, said lever having a slot 251 for receiving said pin, and a laterally projecting pin 252 adapted to operate in a notch 253 in the upper edge of the sector 254 carried by the upper end of the support 249. The pin 252 is yieldably retained within said notch by means of a spring 255 to provide means whereby the bell crank 246 may be shifted in either direction by elevating the lever 248 so as to lift the pin 252 out of the notch 253, after which the lever may be shifted either clock-wise or anti-clock-wise with the pin 252 resting on the member 254 to actuate the shift collar 245, each end of which is provided with clutch elements for engaging clutch elements on their respective bevel-gears 240 and 241. If the said shift sleeve has been moved into engagement with one of the bevel-gears 240 or 241, then the bevel-gear 239 will be rotated, and with it the screw-threaded shaft 237, which in turn will cause the member 236 to be moved longitudinally thereof and the frame 231 rocked. Each of the members 236 is provided with an upwardly projecting lug 256 in which a rod 257 is slidably mounted having one end provided with an upwardly projecting portion 258, said rod also being provided with an angular portion 259 terminating in a horizontal portion 260, the free end of which is connected to the lower end of the lever 248. By this arrangement it will be seen that if the member 236 is moved to the right, then the lug 256 will engage the member 258 and cause the rod 260 to be moved towards the right, which in turn will shift the upper end of the lever 258 to the left until the pin 252 is over the notch 253. The spring 255 will then draw the pin within said notch, locking the shift collar 245 in its neutral position. Thus means is provided for mechanically operating the frames 231 for the purpose of controlling the nozzle arm-operating devices and for automatically disengaging them when a pre-determined movement has been accomplished.

One of the frames 231 is provided with a chain 263 adapted to pass over the upper sprocket wheel 234 and around the sprocket wheel 137, around the sprocket wheel 235 in the reverse manner, as shown in Fig. 6, and around the under sprocket wheel 137 and the sprocket wheel 234, thence over and between the sprocket wheels 142, thence around the sprocket wheels 145, 148, 151, 154, and the sprocket wheel 199, which is in the housing 181, thence to the place of beginning. The chains 261, 262, 263 and 265 are each provided with frames 231 and operated in exactly the same manner, and for that reason the position of the chain 263 only will be described in detail. However, each of the last said chains operates its respective sprocket wheels in the housing 181 (see Fig. 18).

The chain 262 passes over the sprocket 264, which is connected to the sleeve 194, which in turn is connected to the casing 189. It will, therefore, be seen that any rotation of the sprocket 264 will cause said casing 189 to be rotated and the nozzle-supporting arm 210 to be swung in an arc about the axis of said sleeve. Assuming that it is desired to swing the arm 210 through a pre-determined arc (less than 180°) so as to enable the operator to position the nozzle 230 to a pre-determined point, then the operator grasps the lever 248 to shift the corresponding collar 245, wherein one of the corresponding bevel-gears 240 or 241 will be actuated, and with it the corresponding bevel-gear 239, causing the screw-threaded shaft 237 to be rotated and the member 236 to be actuated and the frame 231 oscillated. Assuming that the upper end of said frame is moved in an anti-clock-wise direction, as viewed in Fig. 6, causing the chain to be wrapped around the upper side of the sprocket 235 and unwrapped on the under side in an anti-clockwise direction and the upper run of said chain to be moved to the left, which in turn will cause the sprocket 264 to be also rotated in an anti-clockwise direction, thus causing the arm 210, as viewed in Fig. 19, to be lowered, a reverse movement of the lever 248 will cause the frame 231 to be oscillated in a clock-wise direction and the chain 262 to be wrapped around the sprocket 235 in a clock-wise direction, thus causing the upper run of the chain 262 to be moved to the right and the sprocket 264 to be moved in a clock-wise direction. Each of the chains 261, 262, 263 and 265 is provided with sprockets 154 mounted on the shaft 155 and the sprockets 148 mounted on the shaft 149, sprockets 145 mounted on the shaft 146, and sprockets 151 mounted on the shaft 152, similar to those provided for the chain 139. Any rotation of the shaft 133 and the sprocket 134 to lengthen or shorten said frame also causes the sprockets 235 to be rotated and all of the nozzle-operating chains to be actuated in exactly the same manner as provided for in the chain 139. It should be borne in mind that both of the free ends of the chain 139 are connected to the frame member 141 and that as the said member 141 is moved inwardly or outwardly no movement of the ends of said chains is permitted, one relative to the other or to said frame. In like manner the housing 181 may be moved toward or from the frame member 231 by telescoping the frame 29 without causing any movement of the upper and lower runs of those portions of the chains extending within the housing 181 and over their respective sprockets within said housing, without causing rotation of said sprockets, as long as the frames 231 are held against oscillation. However, rocking the frame 231 will rotate the sprockets within the housing 181, regardless of whether or not the sprockets 134 and 235 are rotated. Thus, it will be seen that the arm 210 may be swung about its horizontal axis by simply actuating the chain 262 by means of the corresponding actuating mechanism, including the shaft 242, the bevel-gears 240 and 241, and the shaft 237 controlled by the lever 248 which may be automatically moved to neutral position in case the operator fails to stop the power-operated device at the proper time by means of the shaft 260 and the lugs 256 being engaged by either the member 258 or the shoulder 259 as the frame 231 is moved to its limit of movement in either direction.

The operation of my device is as follows: Assuming that the telescopic frame is folded in its normal position and resting on the support 88, as shown in Figs. 2 and 3, and it is desired to extinguish a fire developed in the third floor of the building 266, the truck 10 may then be moved to position in front of the building, as indicated in Fig. 1, a hose 267 being attached to the nozzle 230. It is further assumed that the shaft 15 is being constantly rotated from the power shaft 12 and the shaft 43 is also being rotated by the shaft 15, causing the chain 68 to rotate the shaft 70. The member 101 may then be grasped and rotated relative to the member 23 to cause the yoke 91 to be shifted, and with it the collar 75, to engage one of the gears 71 or 78, which will then cause the worm 81 to be actuated and the gear 82 rotated in a clock-wise direction, as shown in Fig. 10, which in turn will cause the gear 86 to be operated in an anti-clock-wise direction and the free end of the frame 29 to be elevated to the position shown in Fig. 1. The lever 122 may then be actuated to cause the shift collar 119 to be moved into operative engagement with the reverse gear mechanism 118 for controlling the worm 117 by power derived from the shaft 113. This in turn will cause the shaft 133 to be rotated by means of the gears 131 and 132, the rotation of the shaft 133 causing the sprocket 134 to be rotated in a clock-wise direction, as viewed in Fig. 6, thereby actuating the chain 139 to cause the frame members 31 and 32 to be moved relative to each other and to the frame member 30, and extended to the position illustrated in said Fig. 1. The arm 210 will at this time be resting parallel with the frame member 31, as illustrated in Fig. 2. The lever 248 may be actuated to set in operation the gear mechanism for controlling the chain 262 by oscillating the frame member 231 in a clock-wise direction, as viewed in Fig. 6, causing the arm 210 to be swung upwardly in a clock-wise direction and at such an angle that the said arm will enter the window opening 268. The flexible element 213 will then be in a plane common to the axis of rotation of said arm.

If it is desired to rotate the said arm 210 about its longitudinal axis through an angle of 90° to bring the flexible element in a plane substantially at right angles to the axis of rotation of said arm, to the position illustrated in Fig. 1, the operator will then operate the control lever 248 corresponding to the chain 263, passing over the sprocket wheel 199 mounted on the sleeve 198, whereby the gear 200 will be rotated and with it the gear 211 and the arm 210. In order to direct the stream of water from the nozzle to the corner 269 of the building 266, the nozzle may then be flexed relative to the arm 210 by operating the control lever 248 corresponding to the chain 261 which passes over the sprocket 206 mounted on the shaft 204, causing said shaft to be rotated and the crank 203 to be actuated, which in turn will cause the flexible element 213 to be flexed through the link arrangement 221a and 224 before described, by moving the link 227 longitudinally, thus providing means whereby the nozzle 230 may be adjusted to any desired angle and supported to position within the building being burned, if so desired, even in a room which is entirely filled with smoke and heated at such temperature that it would be impossible to be entered by a fireman, and to bring the nozzle so close to the fire that the water from the hose 267 may be delivered directly on that portion of the building being burned, all of the arm-actuating devices being controlled by an operator positioned at a point near the pivoted end of the telescopic frame at a position where he will not be affected by the heat and smoke of the fire. If it should so happen that the building should collapse by being burned, and the nozzle or its supporting arm, or the hose leading to the nozzle, became entangled, broken or burned off, then the casing 189 may be unlocked from the casing 181 by simply operating the lever 248 corresponding to the chain 265 which passes over the sprocket 192, mounted on the sleeve 191, and rotation of the sprocket through an angle of 180°, will cause the lug 193 to disengage the lug 183 so that the casing 189 may be easily and quickly detached and a similar casing with another hose nozzle and its supporting arm substituted with very little delay. The ladder sections provide means whereby firemen may be conveyed to the point of disaster or to the outer end of the telescopic frame for the purpose of fire escape. The frame 29 may be rotated about its longitudinal axis for the purpose of bringing the shaft 204 in a vertical position instead of a horizontal position, if so desired, wherein the arm 210 may be rotated substantially in a horizontal plane instead of a vertical plane, or the entire telescopic frame may be rotated about a vertical axis so that the frame may be inclined at various angles about said vertical axis, or the frame may be tilted about a horizontal axis to place it in various angles relative to the ground surface. The free end of the frame may be also brought to position where it may be inclined downwardly from its pivotal point of support 16, if so desired. At the same time the arm 210 may be swung either in a vertical or a horizontal plane with the telescopic frame in any of its inclined positions of adjustment, thus providing means whereby the nozzle 230 may be caused to enter openings of various heights and positions relative to the truck, and the nozzle adjusted to operate at various angles after the arm 210 has been entered into the building.

I claim as my invention:

1. In a device of the class described, a support, a nozzle-supporting arm carried thereon, means pivoting one end of said arm to swing about a horizontal axis, means carried by said support for swinging said arm, means carried by said pivoting means for mounting the arm to rotate about its longitudinal axis, a nozzle clamp, flexible means attaching said clamp to the free end of said arm, means carried by said support for rotating said arm on its longitudinal axis when the arm is in any one of its swinging positions of movement, and means carried by said support for flexing said flexible support to change the angle of said nozzle clamp relative to said arm.

2. In a device of the class described, a support, a nozzle-supporting arm carried thereon, means pivoting one end of said arm to swing about a horizontal axis, means carried by said support for swinging said arm, means carried by said pivoting means for mounting the arm to rotate about its longitudinal axis, a nozzle clamp, flexible means attaching said clamp to the free end of said arm, means carried by said support for rotating said arm on its longitudinal axis when the arm is in any one of its swinging positions of movement, means carried by said support for flexing said flexible support to change the angle of said nozzle clamp relative to said arm, and means detachably fixing said arm to said support and its operative devices carried by said support.

3. In a device of the class described, a support, a nozzle, a nozzle-supporting arm, means mounting one end of said arm to said support to swing about two axes, one at right angles to the other and longitudinally of said arm, means for actuating said arm to swing about either of its axes and independently of each other, flexible supporting means carried by the outer end of said arm, means for clamping a nozzle to said flexible means, and means for connecting a hose leading from a water supply to said nozzle.

4. In a device of the class described, a support, a nozzle, a nozzle-supporting arm, means mounting one end of said arm to said support to swing about two axes, one at right angles to the other and longitudinally of said arm, means for actuating said arm to swing about either of its axes and independently of each other, means located at a point remote from said arm for controlling said arm-actuating means, means supporting said nozzle to be carried by the outer end of said arm, and means for connecting a hose leading from a water supply to said nozzle.

5. In a device of the class described, a support, a telescopic frame having one end pivotally mounted on said support, means for adjusting said frame to various lengths, a nozzle, means carried by the outer end of said frame for mounting said nozzle to swing about a number of axes at various angles, one relative to the other, a power-operated means carried by the movable end of said telescopic frame for actuating and controlling the movement of said arm about each of said axes independently of each other, power-operated means supported near the pivoted end of said telescopic frame for controlling each of the said independently actuated power means when the outer end of said frame is in any one of its adjusted positions of movement, and manually controlled means supported on the fixed end of said frame for causing each of said nozzle-actuating means to become operative or inoperative.

6. In a device of the class described, a support, a telescopic frame having one end pivotally mounted on said support, means for adjusting said frame to various lengths, a nozzle, means carried by the outer end of said frame for mounting said nozzle to swing about a number of axes at various angles, one relative to the other, power-operated means carried by the movable end of said telescopic frame for actuating and controlling the movement of said arm about each of said axes independently of each other, power-operated means supported near the pivoted end of said telescopic frame for actuating each of said independently actuated power means when the outer end of said frame is in any one of its adjusted positions of movement, manually controlled means supported on the fixed end of said frame for causing each of said nozzle-actuating means to become operative or inoperative, and mechanically operated means controlled from a point near said support for causing any one of the nozzle-actuating means to become inoperative when the corresponding nozzle movement has reached a predetermined position.

7. In a device of the class described, a support, a telescopic frame having one end pivotally mounted on said support, a shaft rotatably mounted in the outer end of said frame, a radially supported sleeve carried by said shaft, a hollow shaft mounted in said sleeve to rotate about its longitudinal axis, a flexible nozzle-supporting element carried by the outer end of said shaft, a nozzle, means clamping said nozzle to said flexible nozzle support, means carried by the outer end of said frame for rotating said shaft to cause said arm to swing in a plane at right angles to said shaft, means carried by the outer end of said frame for rotating said hollow shaft about its longitudinal axis, a link within said hollow shaft having one end connected to said flexible nozzle-supporting means, and means carried by the outer end of said frame for moving said link longitudinally to flex said flexible nozzle support.

8. In a device of the class described, a frame, a nozzle, a nozzle-supporting means, means detachably securing said nozzle-supporting means to the movable end of said frame, means mounting said nozzle to said supporting means to be adjusted to various angles relative to a given position, means for adjusting said nozzle to any one of said angular positions, means carried by said frame and detachably secured to said nozzle-adjusting means for causing the said nozzle adjusting means to be actuated, and means for releasing said nozzle-supporting means from said frame and the first nozzle-adjusting means from the means carried by said frame for actuating said nozzle-adjusting means.

9. In a device of the class described, a telescopic frame, a nozzle, a nozzle-supporting means, means detachably securing said nozzle-supporting means to the movable end of said frame, means mounting said nozzle to said supporting means to be adjusted to various angles relative to a given position, means for adjusting said nozzle to any one of said angular positions, means carried by said frame and detachably secured to said nozzle-adjusting means for causing said nozzle-adjusting means to be actuated, and means actuated from a point near the fixed end of said telescopic frame for releasing said nozzle-supporting means from said frame and the first nozzle-adjusting means from the means carried by said frame for actuating said nozzle-adjusting means when the movable end of said telescopic frame is in any one of its adjusted positions.

10. In a device of the class described, a nozzle, a nozzle-supporting arm, means for movably mounting the nozzle to the free end of said arm, said means comprising a support, a plurality of members secured to said support by means of a single pivot, a plurality of second members secured to the first members by a single pivot, a third member secured to the second members by a single pivot, a plurality of links having one end pivotally connected to said support and the other end to the second movable members, a second plurality of links pivotally connecting the first movable members to said third movable member, means connecting said third movable member to said nozzle, a link pivotally connected to the first movable members, and mounted longitudinally within said arm so that longitudinal movement of said link will cause the first set of movable members to be rotated on the first said pivot members, and relative movement between the first set of movable members and the second set and said second set of links to cause relative movement between the said second set of movable elements and the third movable element.

11. In a device of the class described, a nozzle arm having at one end a pair of spaced supporting plates, a pivot extending through said supporting plates, a plurality of slotted plates having one end carried by said pivot, a pivot carried by the movable end of said slotted plates, a second set of slotted plates carried by the second pivot member and supported alternately between the first set of movable members, a pivot carried by the movable end of the last slotted plates, a third plate carried by said pivot member and between the said second plates, a nozzle, clamps carried by one edge of the third plate for fixing said nozzle thereto, links supported in each set of the slots of said first plates, means pivoting one end of said links to the extending plates from said arm, and a pivot member supporting the other ends of said links to the second plates, links carried in the slots of the second set of plates, a pivot connecting one end of said second links to the first movable member, and a pivot connecting the other end of said second links to the third plate, and means for imparting rotary movement to the first set of plates about the pivot member carried by the said arm, whereby the angularity of said nozzle may be adjusted relative to said arm.

12. In a device of the class described, a frame, an arm having one end rotatably and detachably mounted on said frame, means for rotating said arm on two axes, one at right angles to the other and longitudinally of said arm, means for detaching said arm from said frame, a flexible element having one end connected to the free end of said arm, means for clamping a nozzle to the free end of said flexible element, and means for flexing said flexible element when the arm is in any one of its rotative positions of movement.

13. In a device of the class described, a support, a nozzle, a nozzle-supporting arm having a flexible extension at one end, means for mounting the other end of said arm to said support to swing about two axes one at right angles to the other, and longitudinally of said arm, means for actuating said arm to swing about either of its axes and independently of each other, a clamp securing said nozzle to the free end of said flexible extension, and means for bending the flexible extension to vary the angle of said nozzle relative to said arm.

14. In a device of the class described, a support, a nozzle, a nozzle-supporting arm having a flexible extension at one end, means for mounting the other end of said arm to said support to swing about two axes and at right angles to the other, and longitudinally of said arm, means for actuating said arm to swing about either of its axes and independently of each other, a clamp securing said nozzle to the free end of said flexible extension, means for bending the flexible means to vary the angle of said nozzle relative to said arm, and means for detaching said arm from said support.

15. In a device of the class described, a support, a telescopic frame having one end secured to said support, a nozzle-supporting arm detachably and pivotally mounted on the free end of said frame, a nozzle, means flexibly mounting said nozzle to the free end of said arm, means carried by said arm for actuating said nozzle to move it to various angles relative to said arm, means for actuating said arm and said nozzle, actuating means for latching said arm in position on said frame and in operative relation with said arm, a nozzle actuating means, and remote controlled means for releasing said latching means whereby the arm and nozzle may be quickly detached from said frame and said operating mechanism.

16. In a device of the class described, a support, a telescopic frame having one end secured to said support, a nozzle, a nozzle-supporting arm, means carried by the movable end of said arm for moving said nozzle to various operative positions, means for detachably mounting said arm to said frame and in operative relation with said arm actuating means, means for latching said arm on said frame and in operative relation with said arm-operating means, and remote controlled means for actuating said latching means to quickly release said arm from said frame and its operating means.

17. A flexible arm, comprising a supporting member, a movable member, a flexible means connecting the movable member to said supporting member, comprising a series of links pivoted end to end to swing in a common plane, and a series of diagonally arranged links pivotally connecting the opposite side edges of the corresponding ends of alternate links in operative relation, and means for imparting limited rotary movement to the link connected to said supporting means, whereby the entire series of connected links and the movable member may form a rigid arcuate unit at such times as when the first movable link is held against rotation.

OWEN M. CRUMLY.